United States Patent [19]

Kameyama

[11] Patent Number: 5,483,635
[45] Date of Patent: Jan. 9, 1996

[54] CIRCUIT FOR PROTECTING A LOAD CONTROL DEVICE FROM HIGH AND LOW VOLTAGE CONDITIONS

[75] Inventor: Shogo Kameyama, Obu, Japan

[73] Assignee: Nippondenso Co., Ltd., Kariya, Japan

[21] Appl. No.: 187,035

[22] Filed: Jan. 27, 1994

[30] Foreign Application Priority Data

Jan. 29, 1993 [JP] Japan ................................. 5-013835

[51] Int. Cl.⁶ ............................. G11C 7/00; H03K 17/00
[52] U.S. Cl. ...................................... 395/182.12; 307/64
[58] Field of Search ............................ 395/575; 307/64; 315/307; 372/104

[56] References Cited

U.S. PATENT DOCUMENTS

| | | | |
|---|---|---|---|
| 4,010,381 | 3/1977 | Fickenscher et al. | 307/66 |
| 4,336,593 | 6/1982 | Takase . | |
| 5,019,717 | 5/1991 | McCurry et al. | 307/66 |
| 5,281,955 | 1/1994 | Reich et al. | 340/636 |
| 5,381,554 | 1/1995 | Langer et al. | 395/750 |

FOREIGN PATENT DOCUMENTS

| | | |
|---|---|---|
| 1135321 | 9/1989 | Japan . |
| 1288902 | 11/1989 | Japan . |

OTHER PUBLICATIONS

Lee et al., Uninterruptable Power Supply for a Computerised On–Line System, 1989 Annual Meeting of the Industry Application Society, at 1813.

Herman, UPS Trends: What's New with the Mother of All Power Protection?, Teleconnect, Nov. 1991, at 77.

Warren, Increasing UPS and Computer Reliability in Large Installations, 1992 Annual Meeting of the Industry Application Society, at 1991.

Primary Examiner—Robert W. Beausoliel, Jr.
Assistant Examiner—Alan M. Fisch
Attorney, Agent, or Firm—Cushman, Darby & Cushman

[57] ABSTRACT

A protective device for a load-control device which provides preservation of the load-control function of a CPU and prevents misoperation, even if an abnormality occurs, and which comprises a CPU, controlling load in response to sensor signals; a DC voltage-regulation circuit, supplying voltage to the CPU; a current-adjustment means operating so that the power supply line voltage and the DC voltage-regulation circuit output voltage are equal; a voltage-responding means which switches off the current-adjustment means when the power supply line voltage exceeds a prescribed upper limit level; a switching means switching the current-adjustment means off; and a voltage comparison means switching off the current-adjustment means when the power supply line voltage falls below a lower limit level, and wherein the CPU intermittently operates the switching means when the current-adjustment means is switched off.

6 Claims, 6 Drawing Sheets

CIRCUIT FOR PROTECTING A LOAD CONTROL DEVICE FROM HIGH AND LOW VOLTAGE CONDITIONS

BACKGROUND OF THE INVENTION

1. Field of the Invention

This invention relates to a protective device for a load-control device that has a CPU which controls the load based on signals from sensors and more specifically for a load-control device wherein the power supply for said CPU and sensors is obtained from a DC voltage-regulation circuit which drops the output voltage of an external power supply.

2. Description of the Related Art

An ECU (electronic control unit) is often used to control the engine of a vehicle. It usually comprises a CPU, an analog/digital (A/D) converter, and an input/output interface, and generally controls actuators for elements such as an injector and an ignitor, based on information from a sensor group (such as manifold pressure sensor, water temperature sensor, and throttle position sensor) with regard to engine operation and on a preset program.

Figure 8:
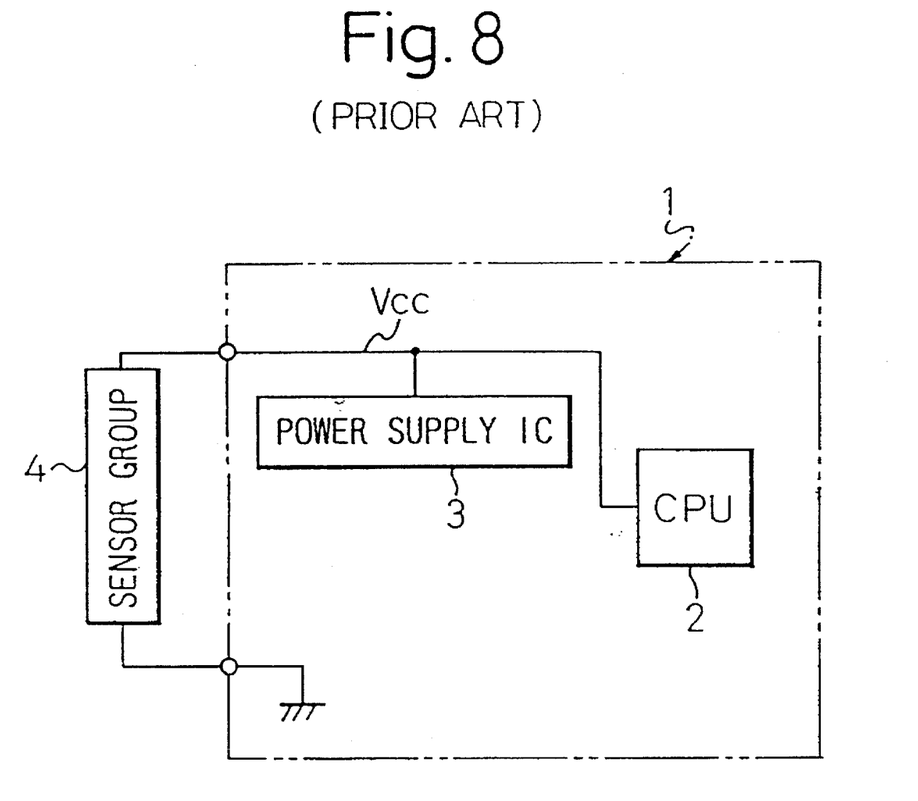
FIG. 8 is the circuit configuration of an example of a previous protective device.

In such an arrangement, in the past, as shown in the simplified drawing of FIG. 8, it has been usual, (in addition to providing within ECU 1 a DC voltage -regulation circuit 3, which supplies power to CPU 2 and additionally to a group of digital ICs not shown in the drawing,) to obtain power for sensor group 4 as well from the output line Vcc of DC voltage-regulation circuit 3.

In the above-described configuration, sometimes the lead wires will make a connection between ECU 1 and sensor group 4, because of miswiring or because said lead wires come into contact either with part of the vehicle body at ground potential, causing the Vcc line to drop to ground potential, or with the power lead from the vehicle battery, causing Vcc to be raised to the supply voltage of the vehicle battery (generally 12 V). Such a situation causes the problem described below.

Essentially, if the output line Vcc is dropped to the ground level, because the power supply to CPU 2 and other digital ICs are cut off, ECU 1 stops functioning, and engine control becomes entirely impossible. Also, on occasion the output line Vcc is raised to the supply voltage from the vehicle battery and a voltage exceeding the allowable input voltage protection value is input to CPU 2 and other elements (generally approximately 7 V). This causes a great danger of permanent damage to the IC group that includes the CPU 2, thus making ECU 1 itself unusable.

A disclosure was made, in Japanese Unexamined Utility Model 1-135321, of a solution to this type of problem. However, the technology disclosed in this publication consists of connecting a resistance in series with a sensor, and when the voltage across the resistance becomes large due to a ground short, turning on a transistor and cutting off the power supply to the sensor.

Thus, in the case in which the voltage across the resistance fluctuates about the voltage at which the transistor is turned on and off, the power supply to the sensor is applied and cut off repeatedly, so that the signal from the sensor is maintained at a level which is not judged to be abnormal. When setting the electrical levels for vehicle control based on information from the sensor signal, there is a danger that a misoperation of the vehicle will result.

SUMMARY OF THE INVENTION

The object of the present invention is for both the cases in which the power supply line for the sensors is raised to the output voltage of the external power supply and the case in which it is dropped to the ground level, to provide a protective device for a load-control device which not only prevents loss of the CPU load-control function, but also does not cause misoperation of the vehicle.

To achieve the above-stated object, a load-control device comprising a CPU that performs load control based on a signal from a sensor and a DC voltage-regulation circuit which takes the output voltage from an external power supply and supplies it to said CPU. The present invention provides a voltage-responding means which adjusts the voltage on the power supply line between said sensor and said external power supply to equal the output voltage of said DC voltage-regulation circuit by controlling a current-adjustment means inserted between between said external power supply and said sensor. It also switches said current-adjustment means to go into the cutoff state when the voltage level on the power supply line reaches or exceeds the first reference value, which is the upper limit level. The present invention also provides a switching means which forcibly switches said current-adjustment means to the cutoff state when it operates, and a voltage-comparison means which when the voltage level on said power supply line drops to or below the lower limit level, which is the second reference value, causes said switching means to operate, thereby switching said current-adjustment means into the cutoff state, and when said current-adjustment means is switched into the cutoff state by said voltage-comparison means, said CPU intermittently halts the operation of said switching means. If the voltage level of said power supply line returns to normal during the time operation of the switching means has been halted, the CPU disables control of the current adjustment means by the voltage-comparison means.

If a short condition occurs in which the power supply line is raised to the output voltage of the external power supply, since the voltage level on that power supply line reaches or exceeds the upper limit level, which is the first reference value, the voltage-responding means switches the current-adjustment means inserted in the power supply line to the cutoff state. It thereby stops the supply of power to the sensor. In this case, since the power supply line is cut off from the DC voltage-regulation circuit by the voltage-responding circuit, the danger of the DC voltage-regulation circuit damaging the CPU by applying an excessive supply voltage to it is eliminated. In addition, when the short is removed, because the voltage level on the power supply line falls below the upper limit level which is the first reference value, the voltage-responding means is reset to the normal condition.

If a short condition occurs in which the power supply line is dropped to the ground potential level, since the voltage level on that power supply line falls to or below the lower limit level, which is the second reference value, the voltage-comparison means causes the switching means to switch said current-adjustment means into the cutoff state. This turn stops the supply of power to the sensor. In this case, since the power supply line is cut off from the DC voltage-regulation circuit by the voltage-responding circuit, the supply of power to the CPU from the DC voltage-regulation circuit continues unchanged and removes the danger of a problem with load control. In this manner, after the current-adjustment means is switched into the cutoff state by the switching means, the CPU intermittently releases the operation of said switching means. Since the operation is such that if the voltage level on said power supply line during the time the operation is released returns to a normal state, control by the voltage-comparison means is disabled and the voltage-responding means is reset to the normal condition.

BRIEF DESCRIPTION OF THE DRAWINGS

FIG. 3(a) to FIG. 3(c) are a set of timing charts describing the operation of the protective device of the present invention.

FIG. 4(a) to FIG. 4(f) are another set of timing charts describing the operation of the protective device of the present invention.

DETAILED DESCRIPTION OF THE PREFERRED EMBODIMENTS

An embodiment of the present invention as applied to an ECU for control of a vehicular engine is described below, with reference made to FIG. 1 through FIG. 4(f).

Figure 1:
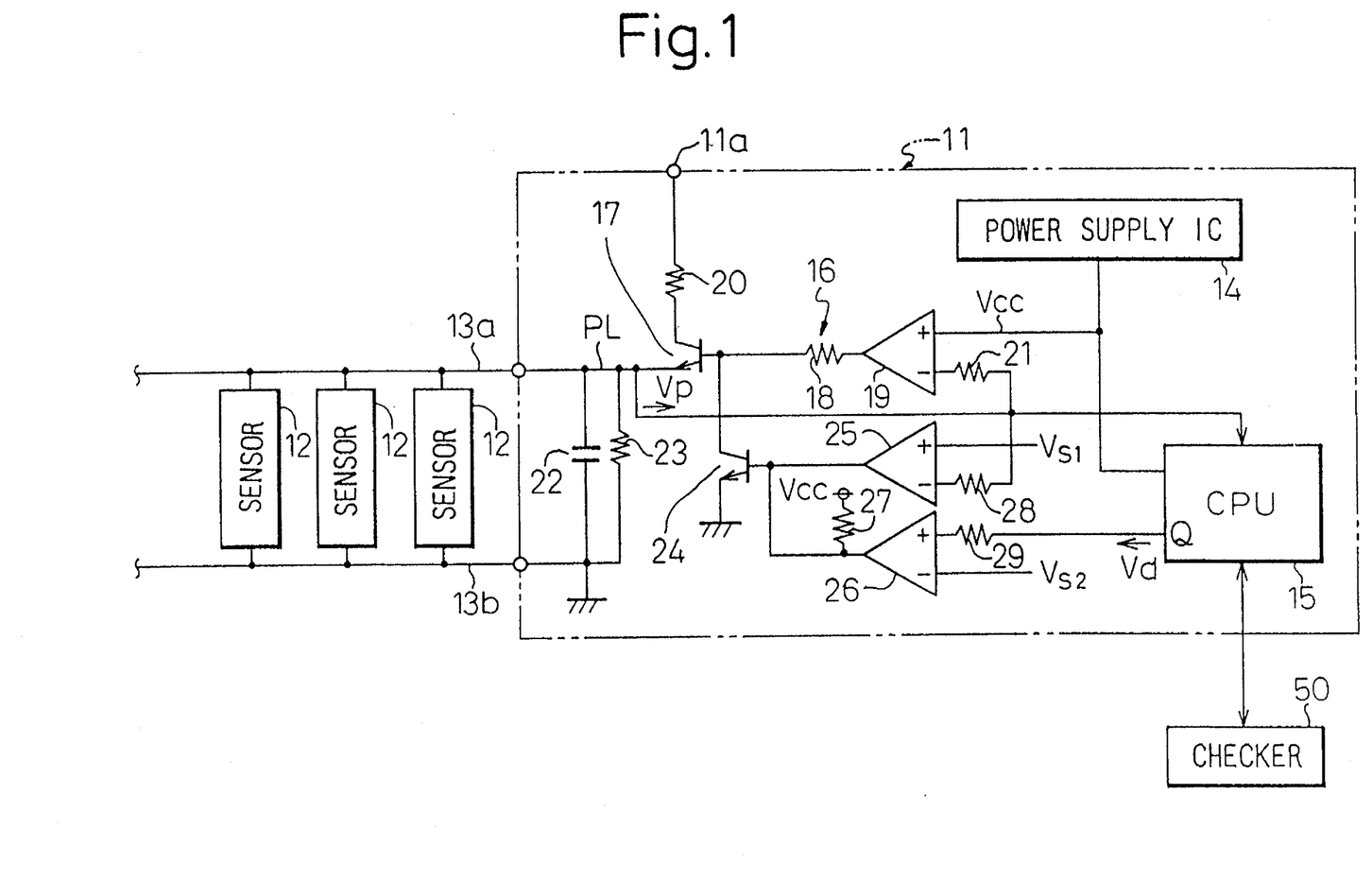
FIG. 1 shows the circuit configuration of one embodiment of the present invention.

FIG. 1 shows the main parts of the electrical configuration. The ECU 11, is the load control-device so as arranged so as to be supplied with power by the vehicle battery (corresponding to the external power supply of the present invention, and having a rated output voltage of, for example, 12 V), which is not shown in the drawing, through power supply terminal 11a. The ECU 11 is connected to a plurality of sensors 12 (for example, a manifold pressure sensor, a water temperature sensor, and a throttle position sensor) for the purpose of obtaining the sensor signals required for control of the vehicle's engine. In addition, in FIG. 1, only the pair of power supply leads 13a and 13b are shown for the purpose of supplying power to the sensor group 12, with the transmission leads for the sensor signals from sensor group 12 to ECU 11 not shown in the drawing.

The internal configuration of ECU 11 is generally as follows.

Figure 2:
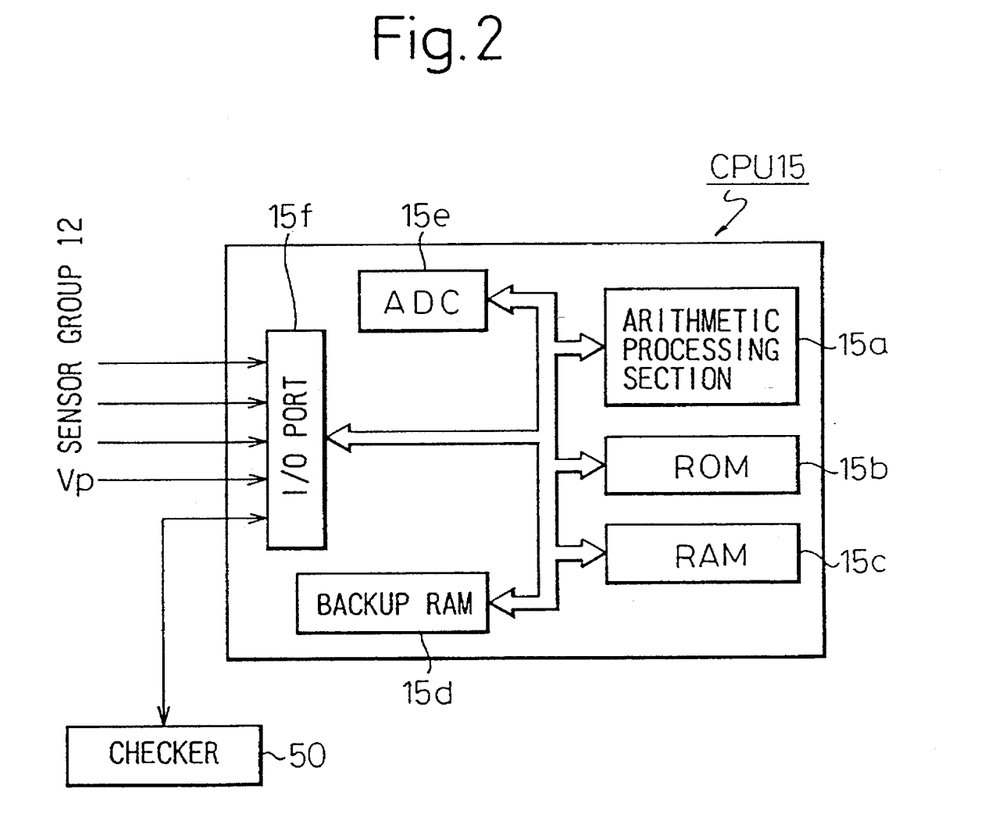
FIG. 2 is the block diagram of an internal configuration of CPU 15 shown in FIG. 1.

Power supply IC 14, which consists of a AC/DC converter, corresponding to the DC voltage-regulating circuit of the present invention, drops the vehicle battery output voltage which is applied via power supply terminal 11a to, for example, 5 V, and outputs to line Vcc. The single-chip CPU 15 is powered from said line Vcc and, as shown in FIG. 2, CPU 15 is a single-chip electronic device consisting of an arithmetic processing section 15a, ROM 15b, RAM 15c, backup RAM 15d, A/D converter 15e, and input/output port 15f. This backup RAM 15d is supplied with power from the vehicle battery even if the ignition switch is off so that the data contained in backup RAM 15d is held constantly.

The analog signals from sensor group 12 are fed through input/output port 15f and A/D converter 15e and input to CPU 15. In addition, the output voltage Vp of the power supply line PL, to be described later, is input via input/output port 15f and A/D converter 15e. CPU 15 monitors the output voltage Vp to detect abnormal conditions such as a ground short, and stores diagnostic data indicating abnormal power supply line conditions into backup RAM 15d. When inspecting the vehicle for failures, a checker can be connected externally to CPU 15 to detect whether there is a problem with the power supply line PL.

Returning to FIG. 1, voltage-responding means 16 is configured to include npn transistor 17 (corresponding to the current-adjustment means in the present invention) which functions as a current amplifier, and operational amplifier 19, which controls the base current of transistor 17 through resistance 18. More specifically, transistor 17, in addition to having its collector connected to power supply terminal 11a through resistance 20, has its emitter connected to power supply line PL. Operational amplifier 19 has the Vcc line connected to its non-inverting input terminal (+) and power supply line PL connected to its inverting input terminal (−) through resistance 21.

In essence, voltage-responding means 16 forms a voltage follower circuit, and adjusts the output voltage vp of power supply line PL so that it is equal to 5 V, which is the line Vcc output voltage (corresponding to the output voltage of power supply IC 14). At voltage-responding means 16, if the voltage level of power supply line PL exceeds 5 V, the output of operational amplifier 19 is inverted to a low level (ground potential level), which subsequently switches transistor 17 to the off state (cutoff state).

Further, because power supply line PL is connected to said sensor group 12 via power supply lead 13a, between power supply line PL and the ground terminal are connected capacitor 22 for the purpose of absorbing noise, and resistance 23 to prevent oscillation in operational amplifier 19.

The npn transistor 24, which corresponds to the switching means of the present invention, has its collector and emitter connected across the base of transistor 17 and ground, so that when it is turned on, transistor 17 is forcibly switched off. The base of transistor 24 is connected to the output terminals of the operational amplifiers which form a first comparator 25 (corresponding to the voltage-comparison means of the present invention) and a second comparator 26, and is also connected to line Vcc through pull-up resistance 27.

The above-stated first comparator 25 compares the 1st reference voltage Vs1, which is applied from the first reference voltage generator circuit, not shown in the drawing, with output voltage Vp, which is applied via resistance 28 from said power supply line PL, the circuit configuration being such that when Vs1>Vp, the output is inverted to a high-level signal. Further, the above-stated first reference voltage Vs1 is set to a value, for example of 2.5 V, which satisfies the relationship 0<Vs1<5 V.

The first comparator 26 compares the second reference voltage Vs2, which is applied from the second reference voltage generator circuit, not shown in the drawing, with the voltage signal Vd applied via resistance 29 from the Q terminal of said CPU 15, the circuit configuration being such that when Vs2<Vd, the output is inverted to a high-level signal. The above-stated voltage signal Vd is a binary signal having two levels: high and low, with high level set to 5 V, and low level set to 0 V. Further, the above-stated second reference voltage Vs2 is set to a value, for example of 2.5 V, which satisfies the relationship 0<Vs2<5 V.

Checker 50, as described previously, is connected when inspecting the vehicle to read out diagnostic data to determine an abnormal condition of the vehicle.

The following is a description of the operation of the above configuration and the functioning of CPU 15, with reference made to FIG. 3(a) through FIG. 5.

If CPU 15 continues to function normally subsequent to the initialization of ECU 11, a high-level (5 V) voltage signal Vd is output from the Q terminal, and because in this state Vs2<Vd, the output from the second comparator 26 is a high-level signal. However, with the output voltage Vp of the power supply line PL at a normal value (5 V), the condition Vs1<Vp is satisfied, and because first comparator 25 outputs a low-level signal, transistor 24 is not turned on. Therefore, with the output voltage Vp of the power supply line PL at a normal value, transistor 24 is maintained in the off state, which maintains the current-amplification function of transistor 17 within voltage-responding means 16, so that the output voltage Vp on the power supply line PL is automatically adjusted to be 5 V at all times.

If, however, miswiring of the power supply leads 13a and 13b or leads 13a and 13b come into contact with the power supply leads from the vehicle battery, the power supply line PL will be raised to the vehicle battery supply voltage (12 V) because of the short (hereafter referred to as a battery short), the operation is as follows.

Figures 3A, 3B, 3C:
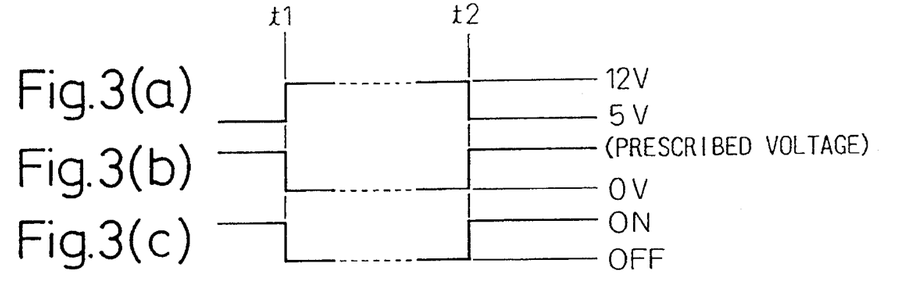

As shown in the timing chart of FIG. 3(a), FIG. 3(b) and FIG. 3(c), until time t1, at which time the above-described battery short occurs, in FIG. 3(a), the power supply line PL output voltage Vp is held at 5 V; in FIG. 3(b), the operational amplifier 19 output maintains a level in accordance with the difference between the above-stated output voltage Vp and the line Vcc output voltage (5 V); in FIG. 3(c), transistor 17 is held in the unsaturated conducting region (indicated simply as ON in FIG. 3(c)), but when the battery short occurs after time t1, the output voltage Vp on power supply line PL is raised to 12 V, which results in the operational amplifier 19 output inverting to a low level, which subsequently results in transistor 17 turning off.

Therefore, the power supply to sensor group 12 is stopped and, in contrast to previously configurations, the power supply line PL and line Vcc within ECU 11 are separated from one another by operational amplifier 19 which has a high impedance, so that there is no danger of damage to CPU 15 and to other IC elements by an excessive voltage supplied from line Vcc. Further, when the above-type of battery short condition is corrected, as shown at time t2 in FIGS. 3(a) to 3(c), transistor 17 returns to the conducting state, whereupon the output voltage Vp on power supply line PL and the output of operational amplifier 19 return to the normal condition.

In this case, the configuration is such that subsequent control by the first comparator 25, which corresponds to the voltage-comparison means, is disabled.

If, on the other hand, a miswiring of power supply leads 13a and 13b or leads 13a and 13b coming into contact with the body ground potential of the vehicle causes the power supply line PL to be dropped to the ground potential level because of this short condition (hereafter referred to as a ground short), the operation is as follows.

Figure 4A:
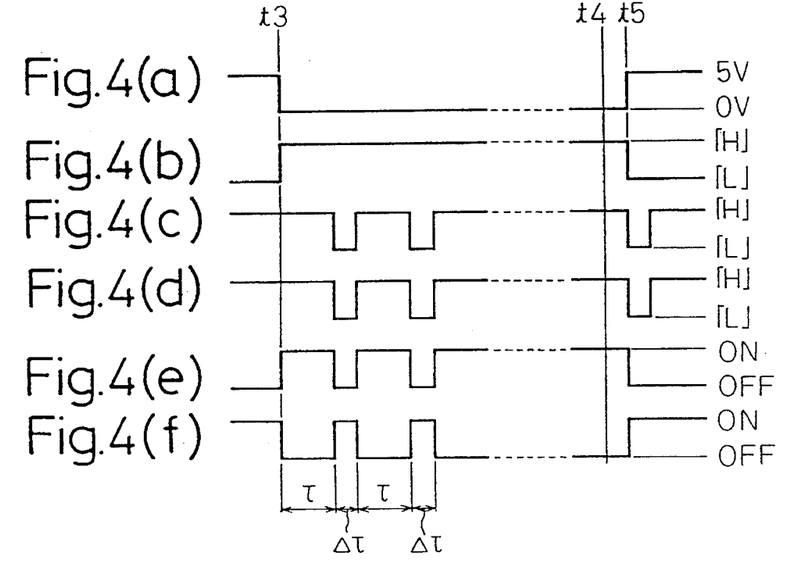

As shown in the timing chart of FIG. 4(a), FIG. 4(b), FIG. 4(c), FIG. 4(d), FIG. 4(e) and FIG. 4(f), until time t3 at which time the above-described ground short occurs; in FIG. 4(a), the power supply line PL output voltage Vp is held at 5 V; in FIG. 4(b), a low-level signal is output from 1st comparator 25; in FIG. 4(c), a high-level voltage signal Vd is output from the Q terminal of CPU 15; in FIG. 4(d), a high-level signal is output from 2nd comparator 26; in FIG. 4(e), transistor 24 is held in the off state, and in FIG. 4(f), transistor 17 is held on in the unsaturated conducting region.

If this type of condition causes a ground short to occur at time t3 shown in FIGS. 4(a) to 4(f), the output voltage Vp on power supply line PL will drop to 0 V, accompanied by the output of 1st comparator 25 being inverted to a high level, so that transistor 24 is turned on, causing transistor 17 to be turned off. Therefore, when a ground short occurs, although the supply of power to sensor group 12 via power supply line PL is cut off, the supply of power to CPU 15 via line Vcc remains intact, so that the functioning of CPU 15 is maintained without disturbance.

In addition, once transistor 17 is turned off, because power supply terminal 11a and power supply line PL are completely isolated from one another, output voltage Vp is of an indeterminate value, and a low-level signal will not again be output from 1st comparator 25. Thus, even if the voltage from power supply line PL is applied, transistor 17 will not repeatedly turn on and off.

Even if it happens that for some reason output voltage Vp falls to or below the reference voltage Vs1, it might thereafter return to normal. To accommodate this, the routine shown in FIG. 5, for the purpose of restoring transistor 17 to the on state should a ground short occur and cause it to temporarily go off, is provided in the control program of CPU 15. The details of this routine and the associated operation are described below.

Figure 5:
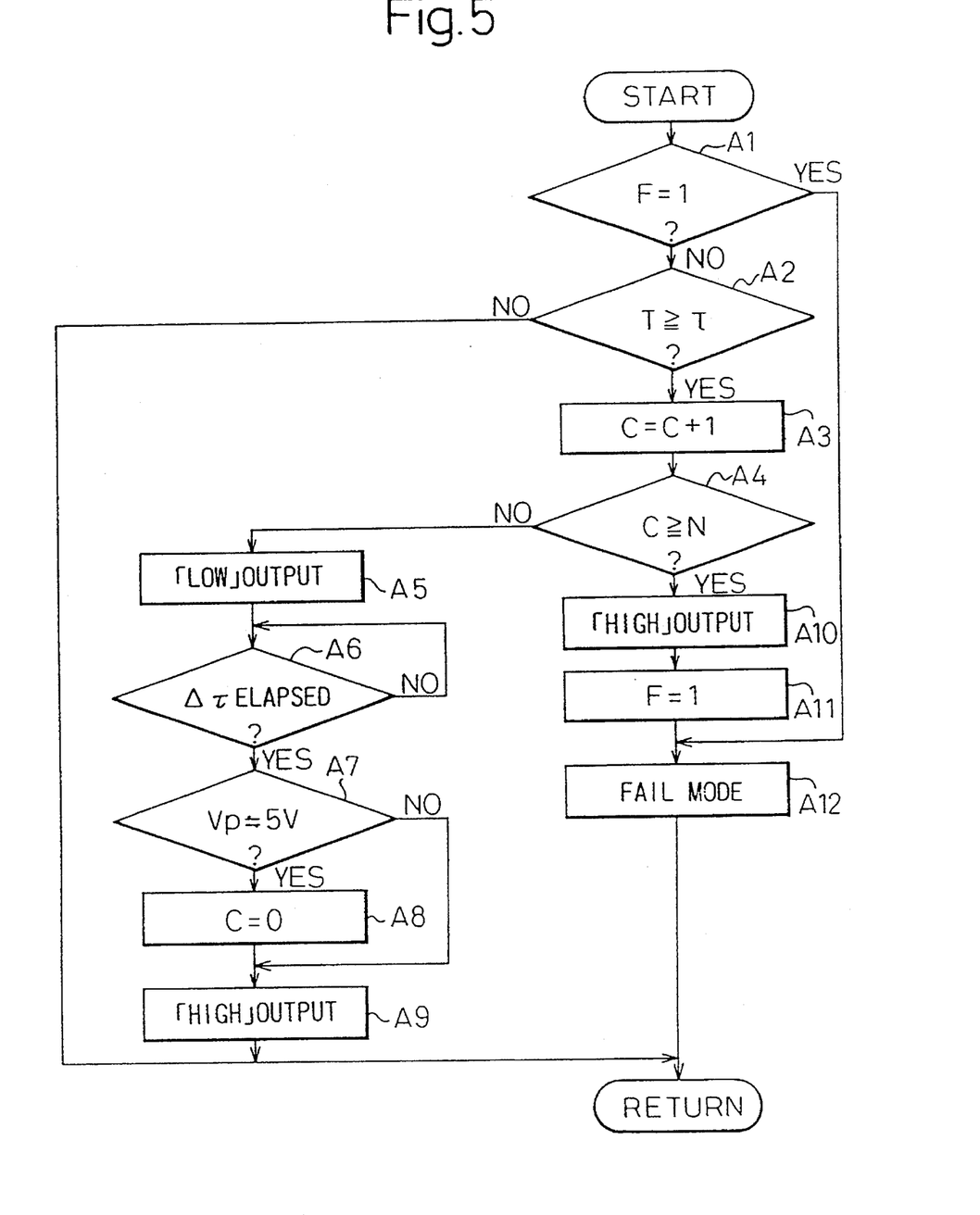
FIG. 5 is a flowchart showing the control sequence of the protective device of the present invention.

This routine is executed repeatedly after the output voltage Vp on the power supply line PL drops to 0 V (that is, when a ground short occurs). The CPU first test the later-described fail-mode flag F (at step A1) to determine whether or not it is set. If the fail-mode flag F has not been set, a check is made (at step A2) to determine whether or not the internal timer elapsed operating time T has reached the set time τ, and return is made directly if T<τ. In this case, the above-stated timer repeats operating with its fixed operating time T, so that the part of the routine after step A2 is repeated each time this time T elapses.

When step A2 is executed, if the elapsed time T on the internal timer has reached the set time τ, the count value C of an internal counter is incremented by 1 (at step A3), after which a determination is made (at step A4) as to whether or not this count value C has reached the required value N. If the count value C has not reached the required value N, that is, if the above step A3 has not been repeated at least N times, the voltage signal Vd from the Q terminal is held at a inverted low-level condition for the short period of time τ (steps A5 and A6). By doing this, because the output of 2nd comparator 26 is inverted to the low level and transistor 24 is switched off, transistor 17 returns to the conducting state. Further, the above-stated time Δτ is set to be slightly longer than the sum of the operating delay time of transistors 24 and 17 and the time for the capacitor to charge.

Next, a determination is made (at step A7) as to whether or not the output voltage Vp on power supply line PL has returned to 5 V. In doing this, if a ground short exists, even if transistor 17 goes into the conducting state, since the above-stated output voltage Vp is 0 V, the test at step A7 will produce a "NO" result, causing execution of step A9, which returns the voltage signal Vd to the high level, and then return.

Upon execution of above-stated step A7, if the ground short condition had been removed, because when transistor 17 goes into the conducting state the output voltage Vp is returned the normal value of 5 V, the test at this step A7 produces a "YES" result, causing execution of step A8, which resets the value of counter C to its initial value, and step A9, after which return is made.

Therefore, as shown in FIGS. 4(a) to 4(f), if a ground short occurs at time t3, during the time before the value of counter C reaches the required value of N, repeatedly each time the set time τ elapses transistor 17 is switched to the conducting state for the time Δτ.

If, for example, a ground short condition is removed at time t4, thereafter when 17 goes into the conducting state at time t5, the output voltage Vp is restored to 5 V, and the output of first comparator 25 is inverted to the low level. As a result, thereafter even if voltage signal Vd inverts to the high level, transistor 24 will return to and remain in the off state, and the output voltage Vp on power supply line PL will be held at 5 V.

The reason for intermittently outputting the low-level signal, that is, the reason for supplying power to the sensors intermittently, is as follows.

This is because, when a ground short occurs, if transistor 17 is switched on, a high voltage is applied to resistance 20 and transistor 17, and if this condition continues for a long time, there is a danger that heating of resistance 20 and transistor 17 will cause damage to these elements.

However, if the count value C reaches the required value N before the ground short condition is removed (the "YES" condition at step A4), CPU 15 executes step A10, which outputs a high-level voltage signal Vd from the Q terminal, step A11, which sets said fail mode flag F, and fail-mode control step A12, which continues control of the vehicle without signals from sensor group 12, after which return is made. If a "YES" condition results at above-stated step A1, that is, after fail-mode control starts, control jumps to the above-stated fail-mode control step A12. The initialization of the above-stated fail mode flag F can be performed, for example, by temporarily cutting off supply of power to ECU 11.

What the above means is that, if the ground short condition is not removed in the relatively long time it takes for the count value C to reach the required value N, this will be interpreted by CPU 15 as a miswiring of, for example, power supply leads 13a and 13b, and switching will be made to perform vehicle engine control in the fail mode.

In essence, the configuration of the above-stated embodiment is such that there is no danger of the above-described effect on the output line Vcc of power supply IC 14, even if a battery short of the power supply line PL for sensor group 12 occurs, causing said line to rise to the vehicle battery supply voltage, or a ground short of said power supply line PL occurs, causing said line to be dropped to the ground potential level. This reliably prevents damage to CPU 15 and other IC elements within ECU 11 from excessive voltage and the loss of CPU 15 functions, so that the loss of vehicle engine control functions by ECU 11 is prevented.

In this embodiment, one power supply IC 14 is provided, said power supply IC 14 providing the power supply for CPU 15, the power supply for sensor group 12 being derived from voltage-responding means 16, which is controlled based on the output voltage of power supply IC 14, and in comparison with the use of two power supply ICs, this offers not only an advantage in space savings, but also the elimination of troublesome voltage correction, because there is no danger that variations will occur in the power supply voltages for CPU 15 and sensor group 12.

In addition, in this embodiment, if the output voltage Vp even once takes on a value indicating a ground short, because the supply of power to sensor group 12 is completely cut off, there is no vehicle control performed based on erroneous signals from sensors.

After the supply of power to sensors is cut off, supply of power is restored by means of output voltage Vd from CPU 15. It it thus possible to perform this resetting according to other parameters input to CPU 15, enabling arbitrary setting of the timing of power restoration, enabling for example the restoration of power supply from a circuit part that ensures safety, and thereby preventing damage to transistors.

This embodiment further comprises a means for detecting an abnormality on the power supply line PL. The abnormality detection processing is described below, making reference to the flowchart of FIG. 6. The processing shown in FIG. 6 is executed repeatedly each prescribed time.

Figure 6:
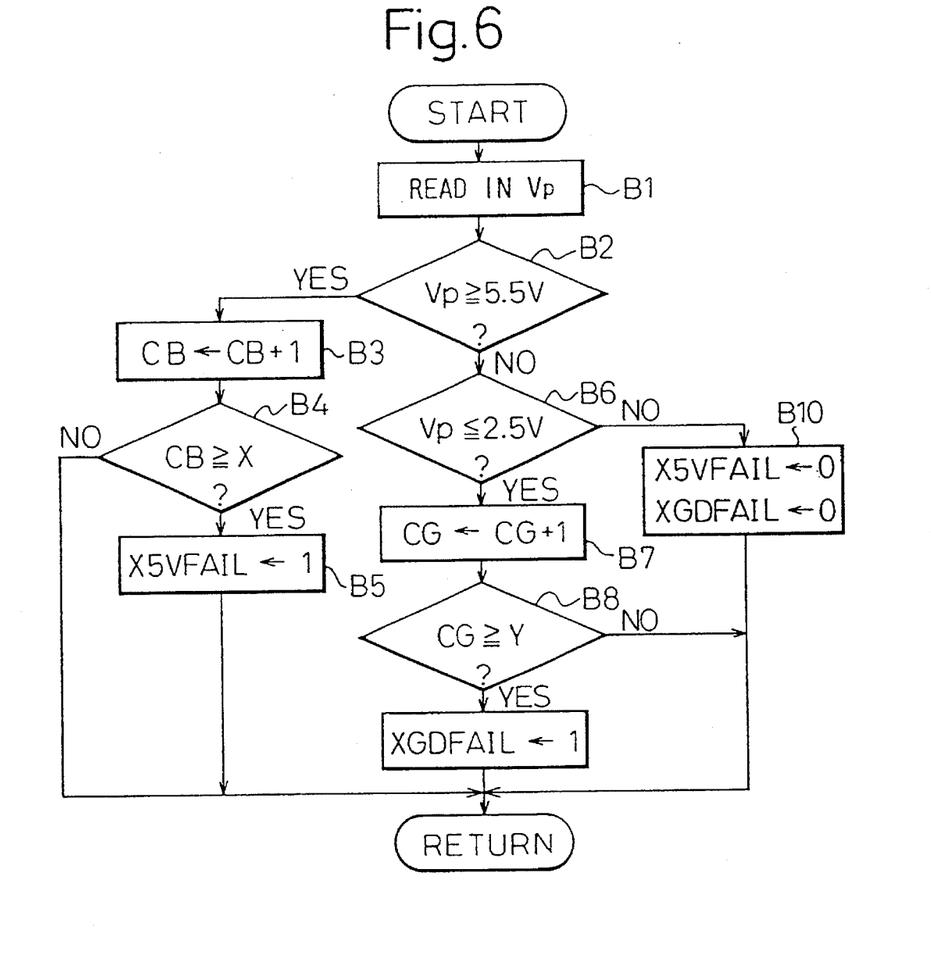
FIG. 6 is a flowchart showing the processing sequence to detect power supply line abnormality in the protective device of the present invention.

In FIG. 6, the output voltage Vp on power supply line PL is read in at step B1, and at step B2 a determination is made as to whether or not this output voltage Vp is equal to or greater than the preset first abnormal voltage reference value as the high-potential abnormal voltage of, for example, 5.5 V. If the output voltage Vp is 5.5 V or greater at step B2, this is taken to be a battery short, the processing proceeding to step B3, at which counter CB is incremented. The above-stated 1st abnormal voltage reference value can be appropriately set by, for example, the first abnormal voltage setting means.

At step B4, a check is made to determine whether the counter CB value that was incremented at step B3 has reached or exceeded a prespecified value X, and if counter CB value has reached or exceeded the prespecified value X, processing proceeds to step B5. At this point the X5VFAIL flag is set, and the fact that the X5VFAIL flag is set is stored in backup RAM 15d.

Thus, if the condition in which the output voltage value Vp reaches or exceeds 5.5 V continues for at least the prescribed amount of time, a battery short is assumed to have occurred, and the X5VFAIL flag is set. If, however, at step B4 the value of counter CB is determined to be not equal to or greater than the prespecified value X, this routine is terminated.

If at the above-mentioned step B2 the first comparison means determines that the output voltage Vp is not 5.5 V or greater, and processing proceeds to step B6. At step B6, a determination is is made as to whether or not this output voltage Vp is equal to or lower than the preset second abnormal voltage reference value as the low-potential abnormal voltage of, for example, 2.5 V. If the output voltage Vp is 2.5 V or lower, processing proceeds to step B7, at which counter CG is incremented. The above-stated second abnormal voltage reference value can be appropriately set by, for example, the second abnormal voltage setting means.

At step B8, a check is made to determine whether the counter CG value that was incremented at step B7 has reached or exceeded a prespecified value Y, and if counter value CG has reached or exceeded the prespecified value Y, processing proceeds to step B9, at which the XGDFAIL flag is set, and the fact that the XGDFAIL flag is set is stored in backup RAM 15d.

Thus, if the condition in which the output voltage value Vp is b 2.5V or lower continues for at least the prescribed amount of time, a ground short is taken to have occurred, and the XGDFAIL flag is set. If, however, at step B8 the value of counter CG is determined to be not equal to or greater than the prespecified value Y, this routine is terminated.

If, at step B6, it is determined that the output voltage Vp is not 2.5 V or lower, it will be assumed that the power supply line PL is normal, and processing will proceed to step B10, at which the X5VFAIL flag and XGDFAIL flag will be reset, and the routine will be terminated.

Therefore, by executing the above processing, it is possible to detect the occurrence of either a battery short or a ground short, and further possible when either of these occurs to constantly store into memory the fact that an abnormality has occurred.

Figure 7:
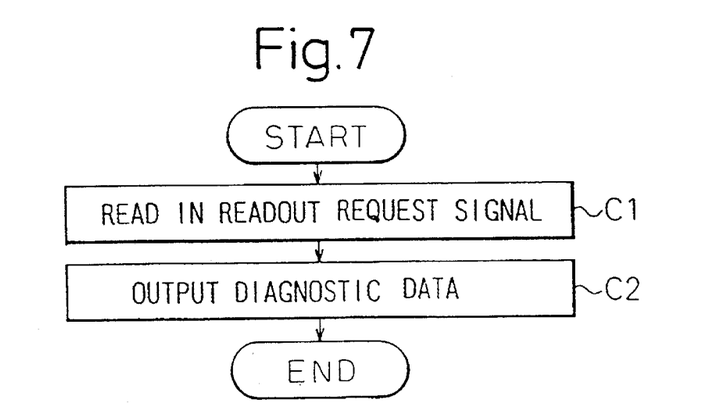
FIG. 7 is a flowchart showing the processing sequence for output to a checker of diagnostic data from the protect device of the present invention.

FIG. 7 is a flowchart showing the processing of reading out of the above-mentioned abnormality diagnostic data in response to a readout request signal from checker 50.

At step C1 the readout request signal is read in from checker 50, and at step C2 the abnormality diagnostic data stored in backup RAM 15*d* is read out in response to readout request signal, and sequentially output to checker 50.

By doing this, it is possible to determine what type of abnormality has occurred when performing, for example, a vehicle inspection at a dealer location, enabling proper action to be taken.

For example, to implement the above-described mode of operation, it is possible to use a device which comprises a means to detect the voltage of the power supply line, and with regard to the abnormal value of voltage on said power supply line an abnormal voltage reference value setting means to preset the high-voltage first abnormal voltage reference value and low-voltage second abnormal voltage reference value, a first comparison means which compares said power supply line voltage with said first abnormal voltage reference value, a second comparison means which compares said power supply line voltage with said second abnormal voltage reference value, a first discrimination means, wherein if in the first comparison means said power supply line voltage is judged to exceed said first abnormal voltage reference value, a determination is made as to whether or not that condition continued for the prescribed amount of time, and if it did, an abnormal condition warning flag is output, and a second discrimination means wherein if in the 2nd comparison means said power supply line voltage is judged to drop below said second abnormal voltage reference value, a determination is made as to whether or not that condition continued for the prescribed amount of time, and if it did, an abnormal condition warning flag is output.

Although in the above embodiment, the present invention is applied to an engine control ECU for a vehicle, the present invention is not limited to this embodiment, and can also be applied to, for example, an ECU for an anti-lock braking system, or what is known as an ECT (electronically controlled transmission) for use in controlling the shifting of the speeds of an automatic transmission, it being possible to variously change the form of the invention in its embodiment, within the scope of the essence of the present invention.

As is clear from the above description, the present invention provides a superior effect, in that since a protective device for a load-control device in accordance with the present invention uses a configuration wherein a voltage-responding means is used to cut off the DC voltage-regulation circuit used supply power to the CPU from the power supply line used to supply power from an external power supply to sensors. The present invention further provides a current-adjustment means inserted in said power supply line which is switched into the cutoff state when said power supply line experiences a short condition, even if the power supply line is either raised to the output voltage of the external power supply or shorted to ground level. The CPU and other IC elements will not be damaged be excessive voltage, nor will the functioning of the CPU be lost, thereby preventing loss of the functioning of the load-control device, in addition to eliminating the need to increase the number of DC voltage-regulation circuits, which provides a savings in required space.

I claim:

1. A load-control device comprising a CPU that performs load control based on a signal from a sensor, a DC voltage-regulation circuit which takes an output voltage from an external power supply and supplies it to the CPU, and a protective device comprising:

current-adjustment means inserted between the external power supply and the sensor;

voltage-responding means which adjusts a voltage on a power supply line located between the sensor and the external power supply to equal the output voltage of the DC voltage-regulation circuit by controlling the current-adjustment means the voltage-responding means switching the current-adjustment means into a cutoff state when the voltage on the power supply line reaches or exceeds a first reference value, which is an upper limit level;

switching means for switching the current-adjustment means into the cutoff state; and voltage-comparison means for causing the switching means to switch the current adjustment means into the cutoff state when the voltage level on the power supply line drops to or below a second reference value, which is a lower limit level, wherein:

an upper limit of the voltage level of the power supply line is approximately equal to the voltage level supplied to the CPU by the DC voltage-regulation circuit, and the voltage-responding means cuts off the current-adjustment means so that the CPU is cutoff from at least one of the sensor and the external power source thereby preventing the CPU from being supplied with a voltage exceeding the upper limit of the voltage level, and once the current adjustment means is switched into the cutoff state by the voltage-comparison means, the CPU controls the current-adjustment means and monitors the voltage level of the power supply line to resume the supply of electric power to the sensor by disabling control of the current-adjustment means by the voltage-comparison means when the voltage level is normal and maintains the current-adjustment means in a cutoff state when the voltage level is abnormal, and wherein the CPU will only repeat the process of cutting off and resuming the supply of electric power to the sensor a predetermined number of times.

2. A load-control device according to claim 1, wherein once the CPU has repeated the operation of placing the current-adjustment means into a cutoff state and returning to a normal state several times, the supply of the electric power to the sensor is not restarted, and the current-adjustment means is cut off so that the electric power source is prevented from being applied to the sensor and the CPU enters into a backup mode.

3. A load-control device according to claim 1, wherein a period of time when the operation of the switching means is reversed by the CPU corresponds to a time in which a detecting operation for detecting the voltage of the power source line is carried out and also corresponds to a time period in which the elements provided inside the electronic control unit circuit can be prevented from being destroyed.

4. A load-control device according to claim 1 wherein the protective device further comprises:

reference value setting means for presetting the first reference value and the second reference value; and voltage detection means for detecting a voltage on the power supply line; wherein the voltage-responding means includes a first comparison means for comparing the voltage detected by the voltage detecting means with the first reference value;

the voltage-comparison means includes a second comparison means for comparing the voltage detected by the voltage detecting means with the second reference value; and the load-control devices further comprises:

first discrimination means which sets an abnormal condition warning flag when the power supply line voltage is judged by the first comparison means to exceed the first reference value for a prescribed period of time; and second discrimination means which sets an abnormal condition warning flag when the power supply line voltage is judged by the second comparison means to have dropped to or below the second reference value for a prescribed period of time.

5. A load-control device comprising a CPU that performs load control based on a signal from a sensor, a DC voltage-regulation circuit which receives an output voltage from an external power supply and supplies it to the CPU, and a protective device comprising:

current-adjustment means inserted between the external power supply and the sensor;

voltage-responding means which adjusts a voltage on a power supply line located between the sensor and the external power supply to equal the output voltage of the DC voltage-regulation circuit by controlling the current-adjustment means, the voltage-responding means switching the current-adjustment means into a cutoff state when the voltage on the power supply line reaches or exceeds a first reference value, which is an upper limit level;

switching means for switching the current-adjustment means into the cutoff state; and voltage-comparison means for causing the switching means to switch the current-adjustment means into the cutoff state when the voltage on the power supply line drops to or below a second reference value, which is a lower limit level, wherein:

an upper limit voltage of the power supply line is approximately equal to the voltage level supplied to the CPU by the DC voltage-regulation circuit, and the voltage-responding means cuts off the current-adjustment means so that the CPU is cutoff from at least one of the sensor and the external power source thereby preventing the CPU from being supplied with a voltage exceeding the upper limit of the voltage level, once the current adjustment means is switched into the cutoff state by the voltage-comparison means, the CPU controls the current-adjustment means and monitors the voltage level of the power supply line to resume the supply of electric power to the sensor by disabling control of the current-adjustment means by the voltage-comparison means when the voltage level is normal and maintains the current-adjustment means in a cutoff state when the voltage level is abnormal, and wherein the CPU will only repeat the process of cutting off and resuming the supply of electric power to the sensor a predetermined number of times, and the protective device is used inside an automobile and electric power is supplied from a DC battery mounted on the automobile to the sensor and the CPU is provided inside an electronic control unit (ECU) circuit mounted on the automobile, and the sensor and the ECU are connected by a power source lead line used to supply the power source to the sensor, the sensor being connected to an external DC battery through the current-adjustment means.

6. A load-control device forming an electronic control unit controlling circuit used on an automobile, comprising a CPU that performs load control based on a signal from a sensor, a DC voltage-regulation circuit which takes an output voltage from an external power supply and supplies it to the CPU, and a protective device comprising:

current-adjustment means comprising a transistor inserted between the external power supply and the sensor;

voltage-responding means comprising an operational amplifier and a resistor which adjusts a voltage on a power supply line located between the sensor and the external power supply to equal the output voltage of the DC voltage-regulation circuit by controlling the current-adjustment means, the operational amplifier and the resistor also switching the current-adjustment means into the cutoff state when the voltage level on the power supply line reaches or exceeds a first reference value, which is an upper limit level;

switching means comprising a transistor for switching the current-adjustment means into the cutoff state; and voltage-comparison means comprising a transistor for causing the switching means to switch the current-adjustment means into the cutoff state when the voltage level on the power supply line drops to or below a second reference value, which is a lower limit level, wherein once the current-adjustment means is switched into the cutoff state by the voltage-comparison means, the CPU intermittently releases the current-adjusting means from the cutoff state, if the voltage level of the power supply line has returned to normal, the CPU disables control of the current-adjustment means by the voltage-comparison means to resume normal operation.

* * * * *